United States Patent
Capogna

(10) Patent No.: US 8,564,979 B2
(45) Date of Patent: Oct. 22, 2013

(54) SINGLE-STAGE HIGH-VOLTAGE POWER SUPPLY WITH HIGH EFFICIENCY AND LOW NETWORK DISTORTION

(75) Inventor: Claudio Capogna, Aulnay Sous Bois (FR)

(73) Assignee: Thales, Neuilly sur Seine (FR)

( * ) Notice: Subject to any disclaimer, the term of this patent is extended or adjusted under 35 U.S.C. 154(b) by 410 days.

(21) Appl. No.: 12/918,475

(22) PCT Filed: Feb. 17, 2009

(86) PCT No.: PCT/EP2009/051847
§ 371 (c)(1),
(2), (4) Date: Sep. 7, 2010

(87) PCT Pub. No.: WO2009/103698
PCT Pub. Date: Aug. 27, 2009

(65) Prior Publication Data
US 2010/0328970 A1   Dec. 30, 2010

(30) Foreign Application Priority Data

Feb. 19, 2008 (FR) .................................... 08 00881

(51) Int. Cl.
*H02M 3/335* (2006.01)
(52) U.S. Cl.
USPC ..................................... 363/21.12; 363/21.17
(58) Field of Classification Search
USPC ................ 363/65, 21.04, 21.09, 21.12, 21.17
See application file for complete search history.

(56) References Cited

U.S. PATENT DOCUMENTS

| 5,311,419 | A | 5/1994 | Shires |
| 5,731,969 | A | 3/1998 | Small |
| 7,511,976 | B2 * | 3/2009 | Zargari et al. .................... 363/50 |
| 7,557,521 | B2 * | 7/2009 | Lys .............................. 315/294 |
| 2001/0036094 | A1 | 11/2001 | Strand et al. |
| 2007/0297198 | A1 * | 12/2007 | Chang ............................. 363/17 |
| 2008/0304300 | A1 * | 12/2008 | Raju et al. ..................... 363/126 |

FOREIGN PATENT DOCUMENTS

WO   2006043837   4/2006

* cited by examiner

*Primary Examiner* — Adolf Berhane
*Assistant Examiner* — Emily Pham
(74) *Attorney, Agent, or Firm* — Baker & Hostetler LLP

(57) ABSTRACT

The invention includes a high-voltage power supply connected, by a network input, to an AC network of frequency Fr, with n phases, and providing a high DC output voltage at at least one HV output. The power supply includes a single-phase high-voltage conversion module per phase of the network having a current rectification circuit connected, by a single-phase input of the conversion module, to a respective phase of the network and, by a rectified-current output, to a switching circuit having at least one switching transistor for switching the rectified current at a frequency Fd and p secondary HV circuits, each providing a secondary, p being an integer greater than or equal to 1, j being the rank of the secondary HV circuit ranging between 1 and p. A control and regulation unit for the power supply comprises a control circuit per conversion module.

13 Claims, 5 Drawing Sheets

SINGLE-STAGE HIGH-VOLTAGE POWER SUPPLY WITH HIGH EFFICIENCY AND LOW NETWORK DISTORTION

CROSS-REFERENCE TO RELATED APPLICATIONS

This application is a National Stage of International patent application PCT/EP2009/051847, filed on Feb. 17, 2009, which claims priority to foreign French patent application No. FR 08 00881, filed on Feb. 19, 2008, the disclosures of which are incorporated by reference in their entirety.

FIELD OF THE INVENTION

The invention relates to high-voltage (or HV) power supplies with high efficiency and with low distortion of the power supply network current.

BACKGROUND OF THE INVENTION

Radiofrequency power transmitters usually comprise power stages involving tubes using one or more high DC voltages. These DC voltages are generally provided by HV power supplies on the basis of an AC electrical supply network. For power transmitters the power supply networks are three-phase networks of frequency 50 Hz, or 400 Hz notably in the case of onboard equipment.

The high-voltage power supplies of the state of the art are achieved according to a structure calling upon a cascade of at least three energy conversion stages, namely a three-phase rectifier bridge for the network current, of Graetz type, (rectification by diodes) followed by a buffer stage converting the rectified voltage emanating from the Graetz bridge into current or voltage, and then a stage generating the high DC voltage or voltages for end use.

The typical efficiency of such a type of power supply is of the order of 85%.

The major disadvantage of this type of power supply with three stages in cascade is of drawing current from the network with a high distortion rate, thus degrading the power factor of the supply. The power factor Fp is defined by the relation $$Fp = Pact/(Ueff \cdot Ieff)$$

Pact is the active power provided by the network to the power supply,

Ueff the effective voltage of the network, and

Ieff the effective current absorbed by the power supply

In the best case the power factor is equal to 1.

These distortions of the network current may be corrected by an external sub-assembly coupled to the input of the power supply and called the power factor corrector. Nonetheless, power factor correctors exhibit the disadvantage of decreasing the reliability of the power supply with a significant impact on its cost, its volume and its mass.

The use of a power factor corrector leads, furthermore, to a decrease in the overall efficiency of the power supply, which is not acceptable for onboard equipment.

SUMMARY OF THE INVENTION

In order to alleviate the disadvantages of the HV power supplies of the state of the art, the invention proposes a high-voltage power supply intended to be connected, by a network input, to an AC network of frequency Fr, with n phases P1, P2, ... Pi, ... Pn, n being an integer greater than or equal to 2, i being the rank of the phase ranging between 1 and n, and providing HV high DC output voltages at least two HV outputs, the power supply comprising:

a single-phase high-voltage conversion module Mi per phase Pi of the network having a current rectification circuit connected, by a single-phase input of the conversion module Mi, to a respective phase Pi of the network and, by a rectified-current output, to a switching circuit having at least one switching transistor for switching the said rectified current at a switching frequency and p secondary HV circuits S1, S2, ... Sj, ... Sp, each providing a secondary HV Vc1, Vc2, Vcj, ... Vcp, p being an integer greater than or equal to 2, j being the rank of the secondary HV circuit ranging between 1 and p, a control and regulation unit UC for the power supply comprising a control circuit CCM1, CCM2, ... CCMi, ... CCMn per conversion module M1, M2, ... Mi, ... Mn providing a control signal Cd1, Cd2, ... Cdi, ... Cdn so as to place the conversion module switching transistor either in an on state during a first time period t1$i$ or in an off state during a following second time period t2$i$ at the switching frequency Fd, t1$i$ being the duration of the on state of the switching transistor of the module Mi, t2$i$ being the duration of the off state of the switching transistor of the same module Mi, Td=t1$i$+t2$i$ being the switching period with Td=1/Fd, characterized in that the n secondary HV circuits Sj of like rank j of the n modules M1, M2, ... Mi, ... Mn are connected in series with the n secondary HV circuits Sj+1 of rank j+1 of the n conversion modules so as to provide the HV high DC output voltages (Vk1, Vk2, Vk3) which are the sum of the secondary voltages Vc1, Vc2, ... Vcj, ... Vcp of the secondary HV circuits in series.

Advantageously, the switching circuit comprises a transformer having a primary winding BP and p secondary windings Bs1, Bs2, Bsj, ... Bsp, the primary winding BP being in series with the switching transistor in parallel with a holding capacitor forming a primary switching circuit, a secondary winding Bsj in series with at least one rectification diode Dsj forming a secondary HV circuit Sj providing the secondary HV Vcj.

In an embodiment of the power supply, the control and regulation unit UC for the power supply comprises an error amplifier AMP providing an error signal uer which is the difference between a voltage uVk which is the image of the output HV of the power supply and a reference signal Vkref of this output HV so as to regulate, through a servocontrol loop, the output HV of the power supply.

In another embodiment of the power supply, each of the control circuits CCMi of a module Mi comprises a level-comparator COMP receiving at a + input a signal us which is the image of the current in the secondary circuit, the other − input being connected to a reference potential and providing at an output a signal of absence of secondary current Is in the output circuits of the switching circuit so as to turn on the switching transistor Trd of the relevant module Mi when the secondary current Is passes through 0 amperes.

In another embodiment of the power supply, each of the control circuits CCMi comprises a device for correcting the distortion of the AC input current of the relevant module Mi through the use of a current loop per module Mi having the input voltage of the network as setpoint, the correction device receiving through an input a signal up which is the image of the current in the primary circuit of the switching circuit, through another input a signal ur which is the image of the voltage Vrd output by the single-phase current rectification circuit of the module Mi and providing through an output a control signal for the switching-type transistor Trd of the relevant module Mi.

In another embodiment of the power supply, the distortion correction device comprises a device for compensating the variations in the input voltage of the network, the compensation device comprising an analogue divider having a division input a driven by the signal ur which is the image of the voltage Vrd output by the rectification circuit, a division input b driven by the signal ur which is the image of the voltage Vrd filtered by a low-pass and then multiplied by two by a multiplier ×2 and an output a/b providing a signal urf which is the image of the network input voltage stabilized so as to drive an input of the device for correcting distortion.

In another embodiment of the power supply, the distortion correction device comprises a signal multiplier receiving through one input the error signal uer output by the error amplifier AMP and, through another input, the signal urf output by the analogue divider, the multiplier providing, at an output, the setpoint signal for the network input voltage.

In another embodiment of the power supply, each of the command circuits CCMi comprises a control logic circuit so as to provide on the basis of the control signal for the switching-type transistor Trd of the relevant module Mi output by the device for correcting distortion and, on the basis of the signal of absence of secondary current Is, a logic signal of variable duty ratio T1$i$/Td for the control of the switching transistor Trd of the relevant module Mi.

A main objective of this invention is to improve the reliability of the HV power supplies supplied by a three-phase network by using a single conversion stage, this stage being formed of three single-phase converters.

Another objective is to obtain a balancing of the currents in the three phases by nesting the secondaries of the single-phase converters.

Another objective is to obtain a power supply with a high conversion efficiency by using elementary switching-based converters, for example of Flyback type, with a transformation ratio which is optimized so as to operate with a toggling of the switching transistors of the Flybacks when the switched current passes through 0 amperes, "Zero Voltage Switching" or ZVS.

Another objective is to obtain a harmonic rate of distortion of the AC supply current of less than 5% through the use of current loops internal to the single-phase converters having the input voltage of the network as setpoint.

BRIEF DESCRIPTION OF THE DRAWINGS

The invention will be better understood with the aid of an exemplary embodiment of an HV power supply according to the invention with reference to the indexed drawings in which.

DETAILED DESCRIPTION

Hereinafter is described an exemplary embodiment of a power supply according to the invention connected to a three-phase network (n=3), each of the three conversion modules M1, M2, M3 comprising three secondary HV circuits S1, S2, S3 (p=3) so as to provide three output HVs Vk1, Vk2, Vk3.

Figure 1:
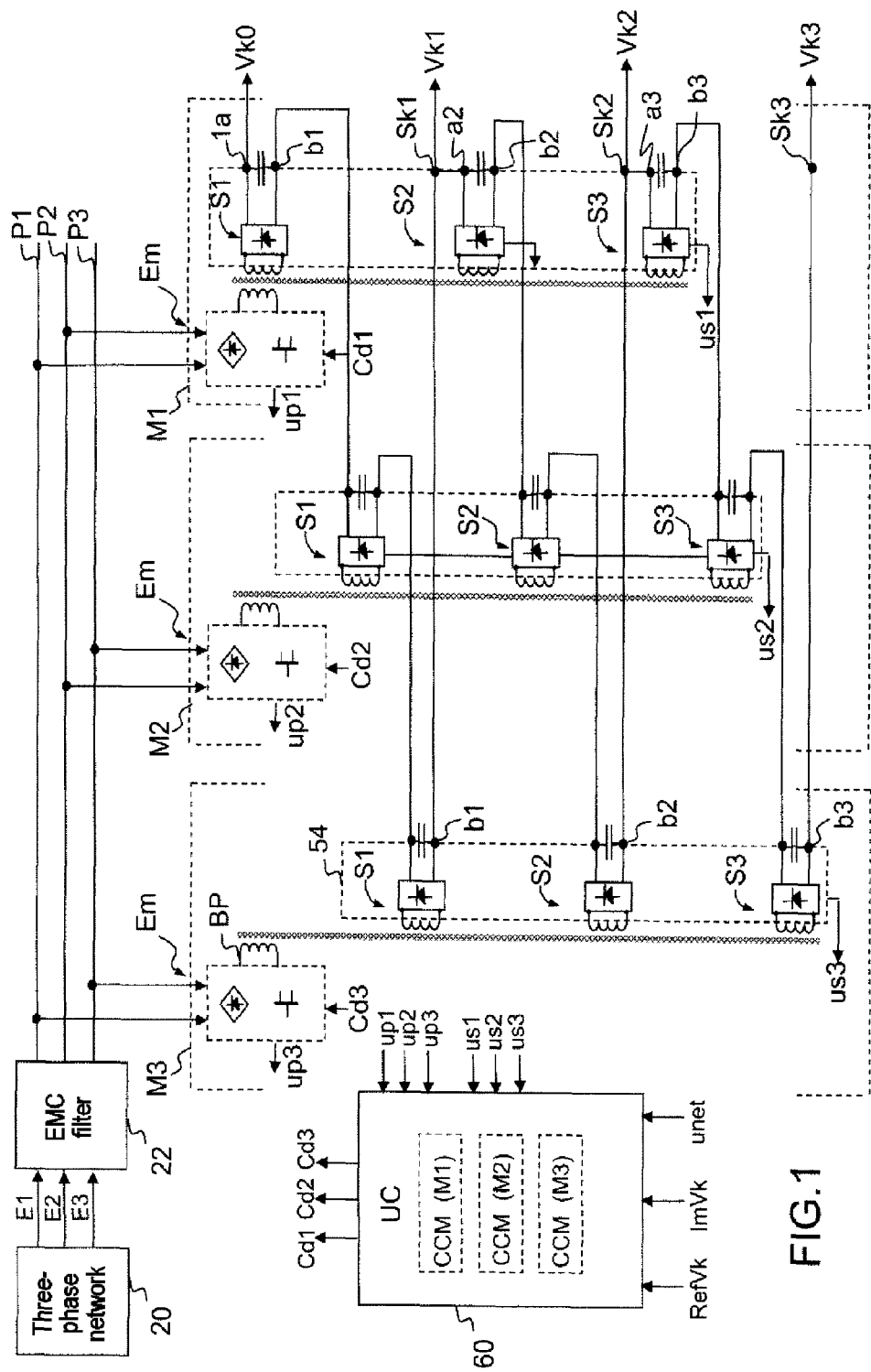
FIG. 1 shows an exemplary embodiment of an HV power supply according to the invention.

FIG. 1 shows an exemplary embodiment of the HV power supply according to the invention intended to be connected to a three-phase network 20 of rms voltage Ue=220 volts between phases P1, P2, P3 operating at the frequency Fr of 400 Htz.

The three-phase network 20 is connected to the power supply by way of an EMC filter 22 so as to comply with the recommendations of electromagnetic compatibility with other services or other equipment.

The three single-phase conversion modules M1, M2, M3 are connected by their network single-phase input Em respectively to the three phases P1, P2, P3 of the network, a first module M1 connected between the first phase P1 and the second phase P2, a second module M2 connected between the second phase P2 and the third phase P3 and a third module M3 connected between the first phase P1 and the third phase P3 so as to balance the levels of the currents in the three phases of the network 20. The power supply provides three levels Vk1, Vk2, Vk3 of output HV with respect to a reference potential Vk0.

Each conversion module Mi, i being a number taking the value 1, 2 or 3 in this embodiment with three modules, is a multi-secondary Flyback with Zero Voltage Switching, termed ZVS switching. This technique allies the simplicity of the arrangement with a minimum of hardware components and optimized efficiency.

Each of the modules M1, M2, M3 comprises, in this embodiment, three secondary HV circuits S1, S2, S3 providing respectively three separate secondary HVs Vc1, Vc2, Vc3.

Figure 2:
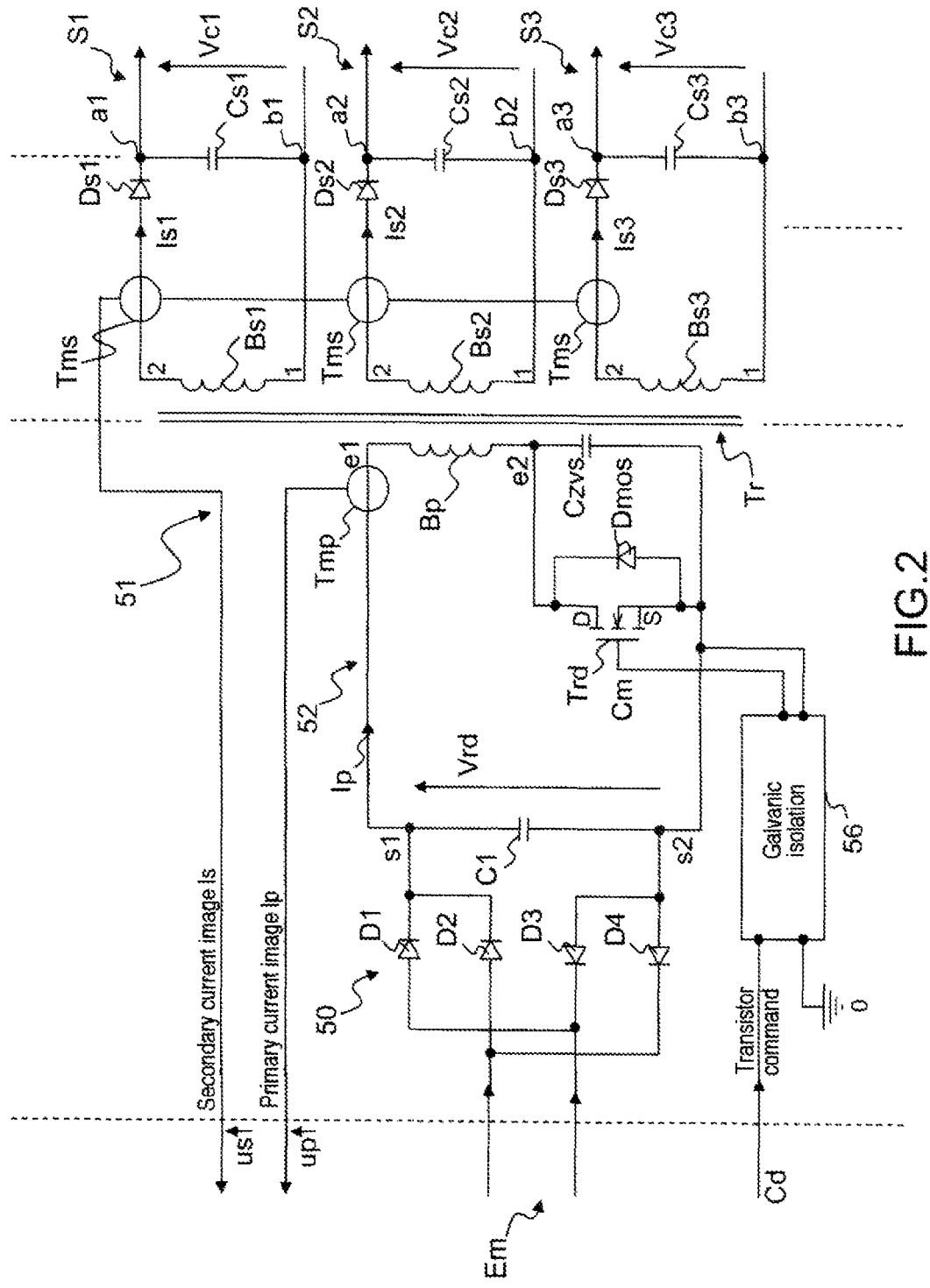
FIG. 2 shows an electrical diagram of one of the modules Mi of the three-phase power supply of FIG. 1.

FIG. 2 shows an electrical diagram of one of the modules Mi of the three-phase power supply of FIG. 1.

The network input Em of the module Mi is connected to a Graetz bridge 50 comprising four rectification diodes D1, D2, D3, D4 arranged in a known manner so as to provide a rectified voltage Vrd to a switching circuit 51 (in this example of a multi-secondary Flyback) through two output terminals s1, s2.

The switching circuit 51 comprises a transformer Tr having a primary winding BP and three secondary windings Bs1, Bs2, Bs3. The primary winding BP is connected in series with a switching transistor Trd in parallel with a holding capacitor Czvs forming a primary switching circuit 52.

Each of the secondary windings Bs1, Bs2, Bs3 forms with a respective rectification diode in series Ds1, Ds2, Ds3 and a respective filtering capacitor Cs1, Cs2, Cs3 the three separate secondary HV circuits S1, S2, S3.

The switching transistor Trd, for example of MOS type, is connected by its drain D to one end e2 of the primary winding BP and by its source S to an output terminal s2 of the Graetz bridge. The other end e1 of the primary winding BP is connected to the other output terminal s1 of the Graetz bridge.

The MOS transistor Trd comprises a control input Cm, which, in this exemplary embodiment, is the gate G of the MOS transistor, so as to be placed either in an on state during a first time period t1 or in an off state through a following second time period t2. The time Td=t1+t2 being the switching period of the module with:

Td=1/Fd Fd Flyback switching frequency.

In a known manner, in this type of switching circuit, the energy transmitted by the primary circuit to the output circuits S1, S2, S3 by the transformer Tr is controlled by the variation in the conduction time t1 of the switching transistor Trd with respect to the period Td.

The first secondary HV circuit S1 provides, between two terminals a1 and b1, the secondary HV Vc1, the second secondary HV circuit S2 provides, between two terminals a2 and b2, the secondary HV Vc2 and the third secondary HV circuit S3 provides, between two terminals a3 and b3, the secondary HV Vc3.

By referring to the diagram of the power supply of FIG. 1, and according to a main characteristic of the power supply according to the invention, the three first secondary HV circuits S1 of each of the three modules M1, M2, M3, each providing the secondary HV Vc1, are connected in series so as to obtain, at a first output Sk1 (terminal b1 of the module M3), the first level of output HV Vk1, this first output Sk1 being connected to the second secondary HV circuits S2 in series of each of the three modules M1, M2, M3, each providing the secondary HV Vc2, so as to obtain, at a second output Sk2 (terminal b2 of the module M3), the second level of output HV Vk2, this second output Sk2 being connected to the third secondary HV circuits S3 in series of the modules M1, M2, M3, each providing the secondary HV Vc3, so as to obtain, at a third output Sk3 (terminal b3 of the module M3), the third level of output HV Vk3 which is the highest.

The HV output voltage Vk3 at output Sk3 will be expressed by the sum of the voltages of the secondary HV circuits in series i.e.:

$$Vk3=3.Vc1+3.Vc2+3.Vc3$$

Each of the modules M1, M2, M3 comprises, for the control, described subsequently, of the power supply (see FIG. 2):
- a primary current transformer Tmp providing a measurement voltage up which is the image of the instantaneous current Ip in the primary circuit 52 of the switching circuit 51,
- a secondary current transformer Tms providing a measurement voltage us which is the image of the instantaneous current Is, the sum of the instantaneous currents Is1, Is2, ... Isj, ... Isp, in the p secondary HV circuits S1, S2, ... Sj, ... Sp, of the power supply. In this example p being equal to three, for the currents Is1, Is2, Is3.

In FIG. 2 the transformer Tms is represented so as to show that the connection wires between the secondary windings Bs1, Bs2, ... Bsj, ... Bsp and the respective rectification diodes Ds1, Ds2, ... Dsj, ... Dsp pass via the primary of the secondary current transformer Tms.
- a galvanic isolation module 56 for a switching transistor Trd state command Cd applied to its control input Cm.

The power supply according to the invention comprises, furthermore, (see FIG. 1) a control and regulation unit UC 60 operating notably the control input Cm of each of the MOS switching transistors Trd for the Flybacks of the modules M1, M2, M3.

Figure 3:
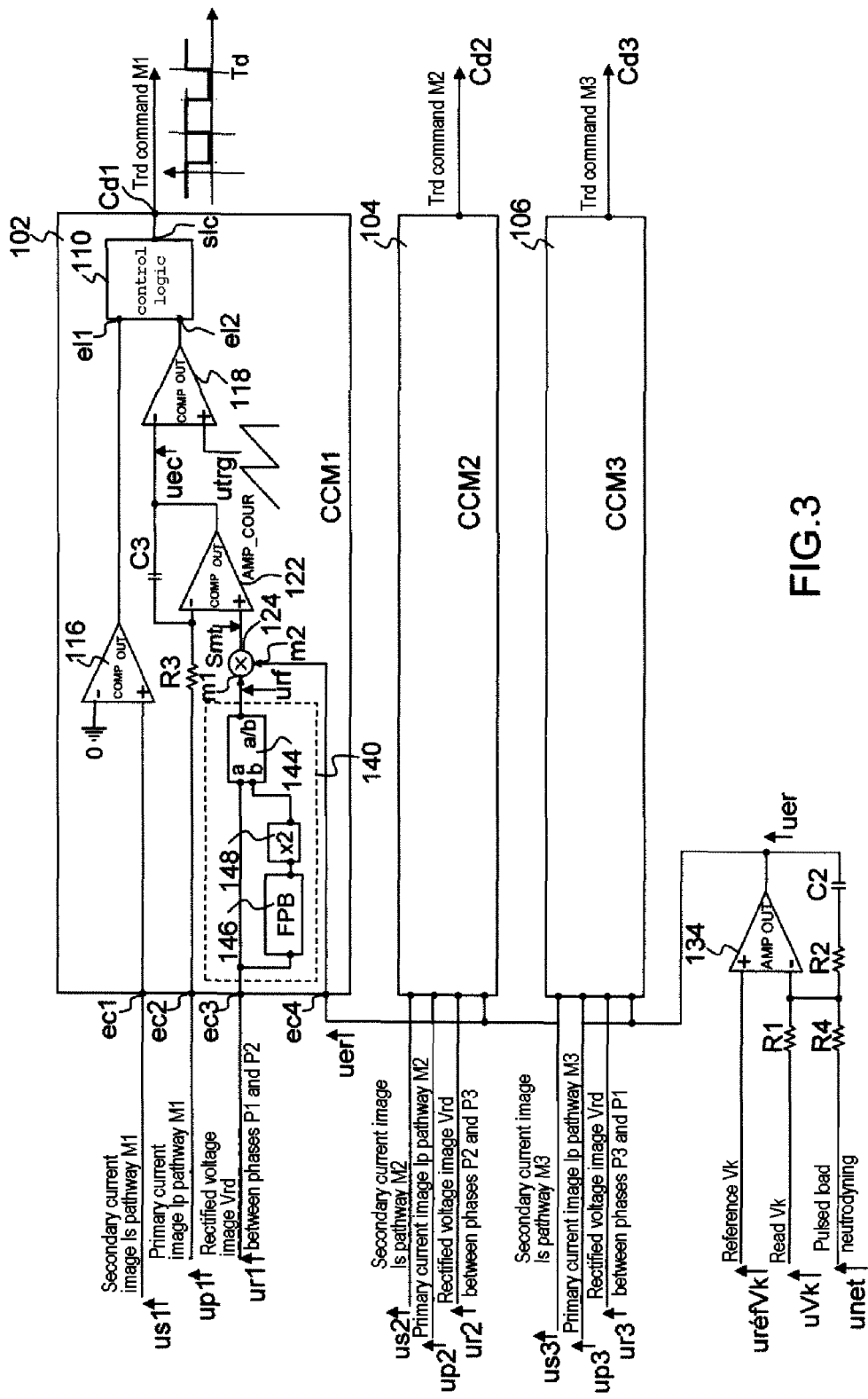
FIG. 3 shows an exemplary embodiment of a control and regulation unit for the power supply of FIG. 1 according to the invention.

FIG. 3 shows an exemplary embodiment of a control and regulation unit UC 60 for the power supply of FIG. 1 according to the invention.

The control and regulation unit UC 60 comprises a command and regulation circuit CCM 102, 104, 106 per module M1, M2, M3 of the power supply. FIG. 3 shows the detail of the command circuit CCM 102 intended for the control of the module M3.

A command circuit CCMi for a respective module Mi of the power supply (i taking the values 1, 2, 3 in this embodiment) comprises a control output Cdi for the transistor Trd of the switching circuit of the controlled module Mi and command inputs ec1, ec2, ec3, ec4 for controlling the various functions of the command circuit CCMi.

The command circuit CCMi comprises control logic 110 providing at a command circuit output CCMi a control signal Cdi for the MOS transistor Trd of the Flyback of the module Mi and two logic inputs, a first input el1 driven by an output Out of a first level-comparator CMP 116 providing at its output Out a signal of passing through 0 amperes of the secondary current Is of the secondary circuits S1, S2, S3 of the Flyback, a second input el2 driven by an output Out of a second level-comparator CMP 118.

A first function carried out by the command circuit CCMi consists in turning on the switching transistor Trd (see FIG. 2) operated by the information regarding absence of current Is in the secondary circuits S1, S2, S3. For this purpose the command inputs of the command circuits CCM 102, 104, 106 are driven by the following signals
- the first input ec1 is driven by the signal us which is the image of the secondary current Is in the output circuits S1, S2, S3 of the switching circuit of the relevant module Mi, i.e.: us1, for the circuit CCM 102 of pathway 1 (or of module M1), us2, for the circuit CCM 104 of pathway 2 (or of module M2), us3, for the circuit CCM 106 of pathway 3 (or of module M3).

The signal us which is the image of the secondary current Is of the relevant module Mi is applied to the + input of the first level-comparator CMPN 116, the other − input being linked to a reference potential, in this instance earth at the 0 volts potential.

The output Out of the first level-comparator CMP 116 changes state when the secondary current Is of the relevant module applied to the + input of the comparator passes through a value close to 0 amperes. This function ensures the operating of the Flyback circuit in ZVS mode.

To ensure other functions described subsequently, the command circuit CCMi receives the following signals:
- through the second input ec2 a signal up which is the image of the primary current Ip in the primary circuit 52 of the Flyback of the relevant module Mi, i.e.: up1, for the circuit CCM 102 of pathway 1 (or of module M1), up2, for the circuit CCM 104 of pathway 2 (or of module M2), up3, for the circuit CCM 106 of pathway 3 (or of module M3),
- through the third input ec3 a signal ur which is the image of the rectified voltage Vrd output by the Graetz bridge of the relevant module Mi, i.e.: ur1, for the circuit CCM 102 of pathway 1 (or of module M1), ur2, for the circuit CCM 104 of pathway 2 (or of module M2), ur3, for the circuit CCM 106 of pathway 3 (or of module M3),
- through the fourth input ec4 an error signal uer which is common to the three command and regulation circuits CCM 102, 104, 106 for the regulation of the output HVs Vk1, Vk2, Vk3 of the power supply.

The command and regulation circuit CCMi comprises a third integrator comparator CMP 122 whose output Out drives the − input of the second comparator 118, its + input being driven by a signal utrg of triangular form, at the Flyback switching frequency Fd.

The − input of the third integrator comparator CMP 122 is driven, by way of a resistor R3, by the signal up which is the image of the current Ip in the primary circuit 52 of the Flyback. The integrator comparator CMP 122 integrates the primary current Ip of the switching circuit with its mean value through the resistor R3 and a feedback capacitor C3, thereby making it possible to compare the mean value of the primary current Ip with the voltage which is the image of the rectified voltage Vrd of the network.

The + input of the third comparator CMP 122 is driven by a signal Smt output by a multiplier 124 resulting from the multiplication of a signal urf applied to an input m1 of the multiplier 124 by an error signal uer (input ec4) applied to a second input m2 of the multiplier.

The signal urf is a voltage which is the image of the rectified voltage Vrd stabilized by a compensation device 140 described further on.

The error signal uer results from the comparison, by an error amplifier AMP 134 of the command unit UC 60, between a reference urefVk of HV voltage Vk3 desired and the image uVk of the HV Vk3 output by the power supply.

According to another main characteristic of the power supply according to the invention, each of the control circuits CCMi comprises a device for correcting the distortion of the AC network input current of the relevant module Mi through the use of a current loop per module Mi having the input voltage of the network as setpoint ur.

The correction device receives through an input ec2 a signal up which is the image of the current in the primary circuit 54 of the switching circuit, through another input ec3 a signal ur which is the image of the voltage Vrd output by the single-phase current rectification circuit 50 of the module Mi and provides, through an output Cdi, a control signal for the switching-type transistor Trd of the relevant module Mi.

The distortion correction device comprises the compensation device 140 for compensating the voltage ur which is the image of the voltage Vrd output by the Graetz bridge so as to avoid a variation in voltage at the output Out of the error amplifier AMP 134 upon variations in the voltage of the three-phase network and thus retain the dynamic range of the error amplifier AMP 134 providing the error information uer for correcting the variations in the voltages Vk1, Vk2, Vk3 output by the power supply.

For this purpose the command circuit CCMi comprises an analogue divider 144 having a division output a/b connected to the second input m2 of the multiplier 124. An input a of the analogue divider 144 is driven by the signal ur which is the image of the rectified voltage Vrd output by the Graetz bridge (input ec3 of the CCM), the other input b of the analogue divider 144 being driven by the mean value urmoy resulting from the signal ur which is the image of the rectified voltage Vrd filtered by a low-pass FPB 146 and then multiplied by a multiplier by two ×2 148.

When the rectified voltage Vrd varies (input voltage of the network) the level at the output a/b of the divider remains stable.

The second comparator 118 receives, through its − input, a signal uec output by the third comparator 122 representing the discrepancy of the current in the phase of the relevant module Mi with respect to the rectified voltage setpoint Vrd, multiplied by the voltage error uer (input m2 of the multiplier), through its − input the triangular signal utrg the switching frequency Fd so as to provide, at its output Out, a control logic signal at the switching frequency Fd with duty ratio varying as a function of the level of the signal uec so as to drive the input el2 of the switching transistor Trd control logic 110.

Figure 4A:
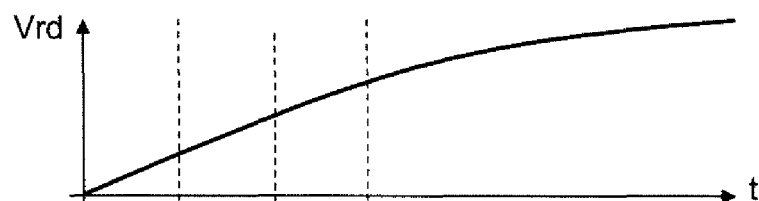
FIG. 4a shows partially the rectified voltage across the terminals of the Graetz bridge of the modules of the power supply of FIG. 1.

FIG. 4a shows partially the rectified voltage Vrd across the terminals of the Graetz bridge of the modules Mi of the power supply of FIG. 1 driving the primary switching circuit 52 at the frequency of the network i.e. in this example at 400 Hz.

Figure 4B:
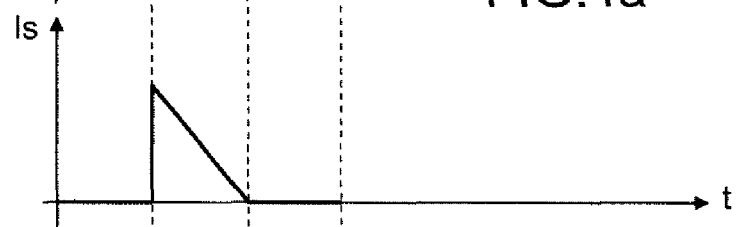
FIG. 4b shows the secondary current Is in the output circuits of the power supply switching circuit.

FIG. 4b shows the secondary current Is in the output circuits of the power supply switching circuit.

Figure 4C:
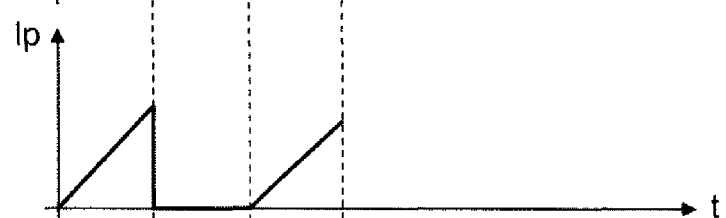
FIG. 4c shows the current Ip in the primary circuit of the power supply switching circuit.

FIG. 4c shows the current Ip in the primary circuit 52 of the power supply switching circuit. In this example the switching frequency Fd is 10 KHz.

Figure 4D:
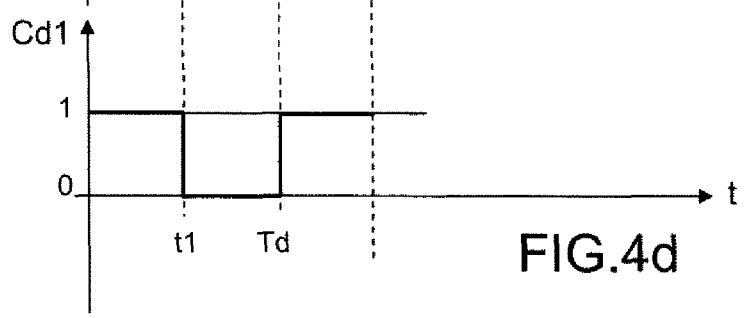
FIG. 4d shows the control signal Cd applied to the switching transistor Trd of one of the modules.

FIG. 4d shows the control signal Cdi applied to the switching transistor Trd of one of the modules Mi. During the time t0 to t1 the transistor Trd is on (state 1 in FIG. 4d), the primary current Ip increases, energy is stored up in the choke Lb of the winding BP of the transformer Tr and then abruptly decreases upon reversal of the control of the switching transistor Trd placing it in the off state (state 0 in FIG. 4d). Starting from the time t1 the secondary current abruptly increases and decreases progressively down to 0 amperes. The energy is provided to the output circuits of the Flybacks. At the end of the period Td when the transistor Trd is again set to the on state, the cycle recommences.

In this embodiment, the toggling of the transistor Trd is performed during the falling edge at the time Td when the secondary current Is becomes zero.

In the case of an application of the power supply for loads exhibiting considerable fast cyclic variations, the power supply may exhibit instabilities. Such is the case for power supplies of radiofrequency transmitters providing repetitive pulses during a determined time span. This type of load is called a pulsed load. For example in the case where the power supply according to the invention is used to supply a travelling-wave microwave-frequency tube for radar application in the impulse regime, the DC voltages applied to the tube are of the 15 kV class.

In this case of pulsed loads, the output current of the power supply varies between 0 amperes and a maximum load current value Ich in a repetitive manner at a frequency Fch which may in certain cases be close to the frequency of the network Fr and this may give rise to an instability of the regulation of the power supply output voltage. The device for regulating the HV power supply, in this case of a load pulsed at a lower frequency Fch than the frequency Fr of the network Fr, does not know how to recognize whether it is dealing with a variation in the input voltage of the network or a variation in the load.

When the load repetition frequency Fch is lower than the frequency Fr of the power supply network, the output voltage of the error amplifier AMP 134 must be compensated so as to avoid a disturbance of the servocontrol of the output HV Vk3. For this purpose a neutralization signal unet at the frequency Fch of variation of the load is applied through a resistor R4 to the − input of the error amplifier AMP 134.

The neutralization signal unet is an image of the variation in the load current applied in phase opposition with the variation in the reading signal uVk at the − input of the error amplifier AMP 134, produced by the variation in load current at the frequency of this variation so as to neutralize it.

In an embodiment of the power supply of FIG. 1, the voltages of the secondary HV circuits are Vc1=3 Kvolts, Vc2 and Vc3=1 Kvolt, the resulting high output voltages HV: Vk3=15 Kvolts, Vk2=12 Kvolts, Vk1=9 Kvolts the overall rate of harmonics of the network input current is reduced to 5%, the efficiency is greater than 89%.

Figure 5A:
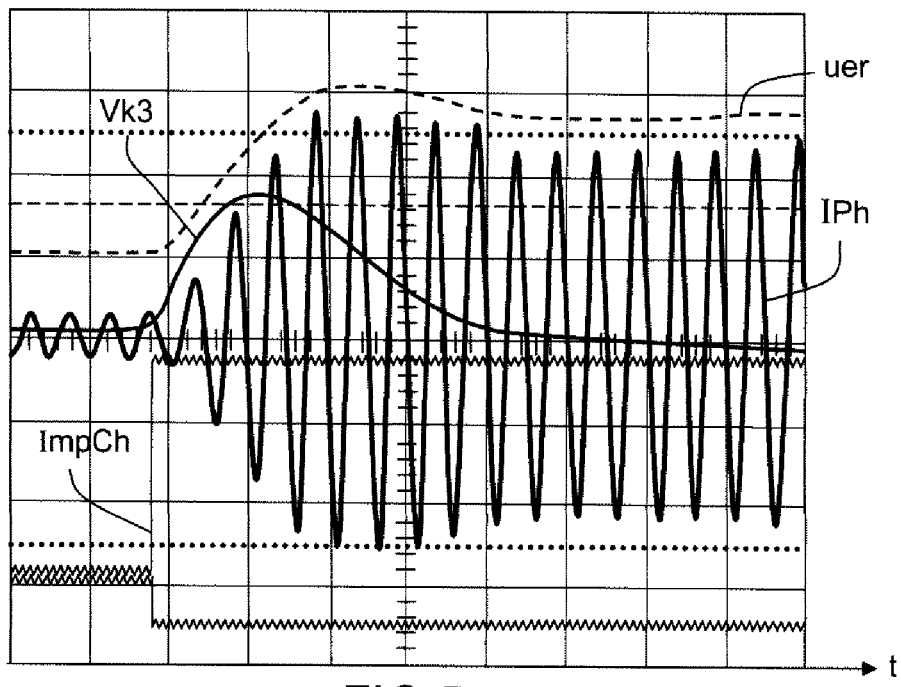
FIG. 5a shows the transient phase during a fast increase in pulsed load.
Figure 5B:
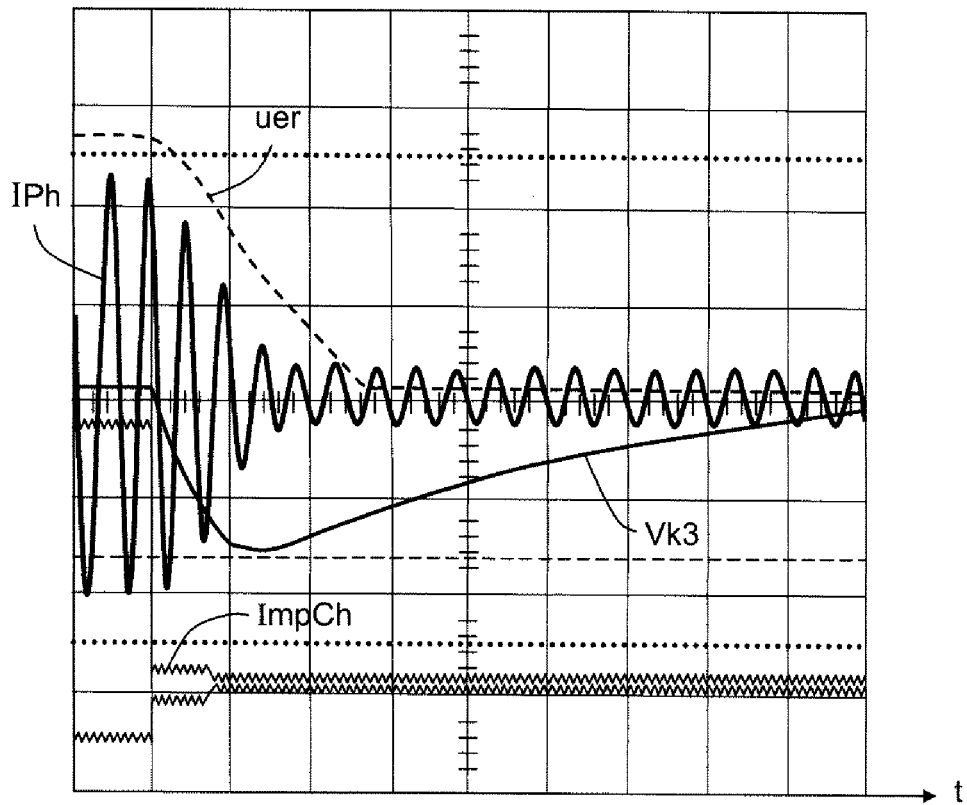
FIG. 5b the transient phase during a fast decrease in pulsed load.

FIG. 5a shows the transient phase during a fast increase in pulsed load and FIG. 5b the transient phase during a fast decrease in load of the power supply in the application to a pulsed load. FIGS. 5a and 5b show:
 the pulsed load control pulse ImpCh,
 the variation in the current Iph in a phase of the AC network,
 the voltage uer output by the error amplifier AMP 134 of the UC,
 the transient regime of the output HV Vk3 from the power supply i.e. a variation of the order of 300 Volts (200 Volts per division) for a voltage Vk3 of 15 Kvolts.

The diagram of the power supply of FIG. 1 according to the invention shows the various signals at the inputs and outputs of the control unit UC (60).

The control unit provides a control signal Cd1 at the output of the command circuit CCM (M1) for the control of the switching transistor Trd of the Flyback of the module M1, Cd2 at the output of the command circuit CCM (M2) for the control of the switching transistor Trd of the Flyback of the module M2 and a control signal Cd3 at the output of the command circuit CCM (M3) for the control of the switching transistor Trd of the Flyback of the module M3.

The command unit receives:
 the voltages up1, up2, up3 and us1, us2, us3 which are the images of the primary currents and secondary currents in the respective primary circuits S2 and secondary HV circuits of the Flybacks of the modules,
 the reference voltage refVk, the voltage uVk which is the image of the output HV of the power supply Vk3 and the pulsed load compensation signal unet.

The solution described by the example of FIG. 1 for improving the behaviour of the HV three-phase/DC converter is applicable to any AC (single-phase or three-phase)/DC converter with galvanic isolation for which all or most of the properties of this invention are sought.

The obtaining of the efficiency objective through the use of a ZVS Flyback, which gives rise to non-synchronizable operation, is in no way detrimental to the usual objectives of electromagnetic compatibility (EMC). This converter is de facto enclosed in the same "hermetic" zone as the EMC filter 22. Moreover this EMC filter is lightened, in terms of performance, volume and cost, because of the low network current distortion rate since the low-frequency components of the current spectrum, which appreciably dimension the passive hardware components of the filter, are in fact almost nonexistent.

The invention claimed is:

1. A high-voltage (HV) power supply intended to be connected, by a network input (E1, E2, E3), to an alternating current (AC) network of frequency Fr, with n phases (P1, P2, ... Pi, ... Pn), n being an integer greater than or equal to 2, i being a rank of the phase ranging between 1 and n, and providing HV high direct current (DC) output voltages (Vk1, Vk2, Vk3) at at least three HV outputs (Sk1, Sk2, Sk3), the high-voltage power supply comprising:
 a single-phase high-voltage conversion module (Mi) per phase Pi of the AC network having a current rectification circuit connected, by a single-phase input (Em) of the single-phase high-voltage conversion module (Mi), to a respective phase Pi of the AC network and, by a rectified-current output (s1, s2), to a switching circuit having at least one switching transistor (Trd) for switching said rectified current output at a switching frequency Fd and p secondary HV circuits (S1, S2, ... Sj, ... Sp), each providing respective secondary high voltages (HVs) (Vc1, Vc2, Vcj, ... Vcp), p being an integer greater than or equal to 2, j being a rank of the secondary HV circuit ranging between 1 and p;
 a control and regulation unit UC for the high-voltage power supply comprising one or more control circuits (CCM1, CCM2, ... CCMi, ..., CCMn) per each of single-phase high-voltage conversion modules (M1, M2, ... Mi, ... Mn) providing respective control signals (Cd1, Cd2, ... Cdi, ... Cdn) so as to place the switching transistor (Trd) either in an on state during a first time period t1i or in an off state during a following second time period t2i at the switching frequency Fd,
 t1i being a duration of the on state of the switching transistor (Trd) of the single-phase high-voltage conversion module (Mi),
 t2i being a duration of the off state of the switching transistor (Trd) of the single-phase high-voltage conversion module (Mi),
 Td=t1i+t2i being a switching period with Td=1/Fd,
 wherein, out of the p secondary HV circuits Sj, n secondary HV circuits Sj of rank j of the single-phase high-voltage conversion modules (M1, M2, ... Mi, ..., Mn) are connected in series with n out of p secondary HV circuits Sj+1 of rank j+1 of the single-phase high-voltage conversion modules (M1, M2, ... Mi, ... Mn) so as to provide the HV high DC output voltages (Vk1, Vk2, Vk3) which are a sum of the secondary high-voltages (Vc1, Vc2, ... Vcj, ..., Vcp) of the secondary HV circuits in series, expressed as Vk3=3.Vc1+3.Vc2+3.Vc3.

2. The high-voltage power supply according to claim 1, wherein the switching circuit comprises a transformer (Tr) having a primary winding BP and p secondary windings Bs1, Bs2, Bsj, ... Bsp, the primary winding BP being in series with the switching transistor (Trd) in parallel with a holding capacitor (Czvs) forming a primary switching circuit, a secondary winding Bsj in series with at least one rectification diode Dsj forming the secondary HV circuit Sj providing the secondary HV Vcj.

3. The high-voltage power supply according to claim 1, wherein the control and regulation unit UC for the high-voltage power supply comprises an error amplifier AMP providing an error signal (uer) which is a difference between a voltage (uVk) which is an image of the HV high DC output voltage (Vk1, Vk2, Vk3) of the high-voltage power supply and a reference signal (urefVk) of the HV high DC output voltages so as to regulate, through a servocontrol loop, the HV high DC output voltages (Vk1, Vk2, Vk3) of the high-voltage power supply.

4. The high-voltage power supply according to claim 1, wherein each of the control circuits of the single-phase high-voltage conversion module (Mi) comprises a level-comparator COMP receiving at a positive (+) input a signal (us) which is an image of a current in one of the p secondary circuits, a negative (−) input being connected to a reference potential (M) and providing at an output (Out) a signal of absence of a secondary current (Is) at an output circuit of the switching circuit so as to turn on the switching transistor (Trd) of the relevant single-phase high-voltage conversion module (Mi) when the secondary current (Is) passes through 0 amperes.

5. The high-voltage power supply according to claim 1, wherein each of the control circuits CCMi comprises a correction device for correcting a distortion of an AC input current of the relevant single-phase high-voltage conversion module (Mi) through a use of a current loop per single-phase high-voltage conversion module (Mi) having an input voltage of the AC network as a setpoint, the correction device receiving through an input (ec2) a signal (up) which is an image of a current in a primary switching circuit of the switching circuit, through another input (ec3) a signal (ur) which is the image of a voltage (Vrd) output by the current rectification circuit of the single-phase high-voltage conversion module (Mi) and providing through an output (Cd1, Cd2, Cd3) a control signal for the switching transistor (Trd) of the relevant single-phase high-voltage conversion module (Mi).

6. The high-voltage power supply according to claim 5, wherein the correction device comprises a compensation device for compensating variations in the input voltage of the AC network, the compensation device comprising an analogue divider having a division input (a) driven by the signal (ur) which is the image of the voltage Vrd output by the rectification circuit, a division input (b) driven by the signal (ur) filtered by a low-pass filter (FPB) and then multiplied by two by a multiplier ×2 and an output (a/b) providing a signal (urf) which is an image of the input voltage of the AC network stabilized so as to drive an input of the correction device for correcting distortion.

7. The high-voltage power supply according to claim 6, wherein the correction device comprises a signal multiplier receiving through one input (m2) an error signal (uer) output by an error amplifier AMP and, through another input (m1), the signal (urf) output by the analogue divider, the signal multiplier providing, at an output, the setpoint for the input voltage (Smt) of the AC network.

8. The high-voltage power supply according to claim 7, wherein each of the control circuits comprises a control logic circuit so as to provide on a basis of the control signal for the switching transistor (Trd) of the relevant single-phase high-voltage conversion module (Mi) output by the correction device for correcting distortion and, on a basis of a signal of absence of a secondary current (Is), a logic signal of variable duty ratio T1$i$/Td for a control of the switching transistor (Trd) of the relevant single-phase high-voltage conversion module (Mi).

9. The high-voltage power supply according to claim 1, wherein each of the single-phase high-voltage conversion modules M1, M2, . . . Mi, . . . , Mn comprises, for a control of the HV power supply:

a primary current transformer (Tmp) providing a measurement voltage (up) which is an image of an instantaneous current (Ip) in a primary switching circuit of the switching circuit; and a secondary current transformer (Tms) providing a measurement voltage (us) which is an image of an instantaneous current (Is) which is a sum of instantaneous currents (Is1, Is2, Is3) in the p secondary HV circuits (S1, S2, . . . Sj, . . . , Sp) of the HV power supply.

10. The high-voltage power supply according to claim 9, wherein connection wires between secondary windings (Bs1, Bs2, . . . Bsj, . . . , Bsp) and respective rectification diodes (Ds1, Ds2, . . . , Dsj, . . . , Dsp) of the p secondary HV circuits (S1, S2, . . . Sj, . . . , Sp) pass via a primary of the secondary current transformer (Tms).

11. The high-voltage power supply according to claim 1, wherein when a load of the HV power supply is pulsed, an output current of the HV power supply varying between 0 amperes and a maximum load current value (Ich) in a repetitive manner at a frequency (Fch) close to a frequency of the AC network, a neutralization signal (unet), at the frequency (Fch) of a variation in the load, is applied, through a resistor (R4), to a negative (−) input of an error amplifier AMP.

12. The high-voltage power supply according to claim 11, wherein the neutralization signal (unet) is an image of a variation in a load current applied in phase opposition with a variation in a reading signal (uVk) at the input of the error amplifier AMP, produced by the variation in the load current at frequency of the variation in the reading signal (uVk) so as to neutralize the variation in the reading signal (uVk).

13. The high-voltage power supply according to claim 1, wherein the high-voltage power supply is connected to a three-phase network (n=3), each of the three single-phase high-voltage conversion modules M1, M2, M3 of the three-phase network comprising three output circuits S1, S2, S3 (P=3) so as to provide the three HV high DC output voltages (Vk1, Vk2, Vk3).

* * * * *